US012719074B2

(12) United States Patent
Gantner

(10) Patent No.: US 12,719,074 B2
(45) Date of Patent: Aug. 25, 2026

(54) LIQUID MEMBRANE CELL ASSEMBLIES

(71) Applicant: Skip Technology, Inc., Portland, OR (US)

(72) Inventor: Brennan Lonn Gantner, Portland, OR (US)

(73) Assignee: Skip Technology, Inc., Portland, OR (US)

( * ) Notice: Subject to any disclaimer, the term of this patent is extended or adjusted under 35 U.S.C. 154(b) by 703 days.

(21) Appl. No.: 18/185,669

(22) Filed: Mar. 17, 2023

(65) Prior Publication Data

US 2023/0307684 A1 Sep. 28, 2023

Related U.S. Application Data

(60) Provisional application No. 63/322,812, filed on Mar. 23, 2022.

(51) Int. Cl.
*H01M 8/18* (2006.01)
*H01M 8/02* (2016.01)
(Continued)

(52) U.S. Cl.
CPC ............ *H01M 8/188* (2013.01); *H01M 8/02* (2013.01); *H01M 8/04194* (2013.01); (Continued)

(58) Field of Classification Search
None
See application file for complete search history.

(56) References Cited

U.S. PATENT DOCUMENTS 5,160,596 A 11/1992 Keller, Jr.
5,534,120 A 7/1996 Ando et al.
(Continued)

FOREIGN PATENT DOCUMENTS

CN 111490279 A 8/2020
JP 61-177363 A 8/1986
(Continued)

OTHER PUBLICATIONS

Yu et al., "Scalable membraneless direct liquid fuel cells based on a catalyst-selective strategy." Energy & Environmental Materials (2018), vol. 1(1), pp. 13-19.
(Continued)

*Primary Examiner* — Jonathan Crepeau
(74) *Attorney, Agent, or Firm* — Chernoff, Vilhauer LLP

(57) ABSTRACT

Liquid membrane cell assemblies are disclosed. In some embodiments, the liquid membrane cell assembly includes an elongate base having opposed first and second end portions and a central portion disposed therebetween. The first and second end portions each includes an elongate body, an electrolyte channel within the body, an electrolyte port fluidly connected to the electrolyte channel, a fuel channel within the body, and a fuel port fluidly connected to the fuel channel. The central portion includes spaced and opposed first and second members that connect the bases of the first and second portions and that horizontally define an open area therebetween. The liquid membrane cell assembly additionally includes an anode adjacent the first and second members, and a cathode adjacent the first and second members such that the base is disposed between the anode and the cathode. The anode and cathode vertically define the open area therebetween.

21 Claims, 11 Drawing Sheets

(51) Int. Cl.

| | |
|---|---|
| ***H01M 8/04082*** | (2016.01) |
| ***H01M 8/04186*** | (2016.01) |
| ***H01M 8/04276*** | (2016.01) |
| ***H01M 8/24*** | (2016.01) |
| ***H01M 10/48*** | (2006.01) |

(52) U.S. Cl.

CPC ... *H01M 8/04201* (2013.01); *H01M 8/04283* (2013.01); *H01M 8/24* (2013.01); *H01M 10/48* (2013.01)

(56) References Cited

U.S. PATENT DOCUMENTS

| | | | |
|---|---|---|---|
| 5,865,966 | A | 2/1999 | Watanabe et al. |
| 6,713,206 | B2 | 3/2004 | Markoski et al. |
| 7,252,898 | B2 | 8/2007 | Markoski et al. |
| 7,651,797 | B2 | 1/2010 | Markoski et al. |
| 8,158,300 | B2 | 4/2012 | Markoski et al. |
| 8,163,429 | B2 | 4/2012 | Markoski et al. |
| 8,283,090 | B2 | 10/2012 | Markoski et al. |
| 8,551,670 | B2 | 10/2013 | Mittelsteadt et al. |
| 8,632,927 | B2 | 1/2014 | Wilkinson et al. |
| 9,537,169 | B2 | 1/2017 | Mittelsteadt et al. |
| 9,601,789 | B2 | 3/2017 | Kim et al. |
| 10,411,284 | B2 | 9/2019 | Bazant et al. |
| 10,844,494 | B2 | 11/2020 | Esposito et al. |
| 10,907,262 | B2 | 2/2021 | Hosseini Hashemi et al. |
| 2007/0287034 | A1* | 12/2007 | Minteer .................. H01M 8/16 429/2 |
| 2008/0008911 | A1 | 1/2008 | Stroock et al. |
| 2008/0070076 | A1 | 3/2008 | Makita et al. |
| 2009/0035644 | A1 | 2/2009 | Markoski et al. |
| 2012/0070766 | A1 | 3/2012 | Braff |
| 2012/0148931 | A1 | 6/2012 | Kim et al. |

FOREIGN PATENT DOCUMENTS

| | | | |
|---|---|---|---|
| JP | 2008-521209 | A | 6/2008 |
| WO | 2006104522 | A2 | 5/2006 |
| WO | 2010083219 | A1 | 7/2010 |

OTHER PUBLICATIONS

Bae et al., "A membrane-free electrochemical cell using porous flow-through graphite felt electrodes." Journal of Applied Electrochemistry (2008), vol. 38, pp. 637-644.

Thorson et al., "Design rules for electrode arrangement in an air-breathing alkaline direct methanol laminar flow fuel cell." Journal of Power Sources (2012), vol. 218, pp. 28-33.

Bamgbopa et al., "Prospects of recently developed membraneless cell designs for redox flow batteries." Renewable and Sustainable Energy Reviews (2017), vol. 70, pp. 506-518.

Bamgbopa et al., "Cyclable membraneless redox flow batteries based on immiscible liquid electrolytes: Demonstration with all-iron redox chemistry." Electrochimica Acta (2018), vol. 267, pp. 41-50.

Suss et al., "Membraneless flow battery leveraging flow-through heterogeneous porous media for improved power density and reduced crossover." RSC Advances (2016), vol. 6(102), pp. 100209-100213.

Braff et al., "Membrane-less hydrogen bromine flow battery." Nature Communications (2013), vol. 4, pp. 2346.

Braff et al., "Inertial effects on the generation of co-laminar flows." Journal of Fluid Mechanics (2015), vol. 767, pp. 85-94.

Braff et al., "Hydrogen bromine laminar flow electrochemical cell for high power and efficiency energy storage applications." ECS Transactions (2011), vol. 33(39), p. 179.

Braff et al., "Boundary layer analysis of membraneless electrochemical cells." Journal of The Electrochemical Society (2013), vol. 160(11), p. A2056.

Braff et al., "Numerical and analytic modeling of a membraneless hydrogen bromine laminar flow battery." ECS Transactions (2013), vol. 53(7), p. 51.

Braff, "Membraneless hydrogen bromine laminar flow battery for large-scale energy storage." PhD thesis, Massachusetts Institute of Technology (2014).

Chakrabarti et al., "Charge-discharge performance of a novel undivided redox flow battery for renewable energy storage." International Journal of Green Energy (2010), vol. 7(4), pp. 445-460.

Chakrabarti et al., "Ruthenium-based redox flow battery for solar energy storage." Energy Conversion and Management (2011), vol. 52(7), pp. 2501-2508.

Cook et al., "Development of a membraneless organic redox flow battery." In ASME International Mechanical Engineering Congress and Exposition, vol. 52071, p. V06AT08A029. American Society of Mechanical Engineers (2018).

Ferrigno et al., "Membraneless vanadium redox fuel cell using laminar flow." Journal of the American Chemical Society (2002), vol. 124(44), pp. 12930-12931.

Gilson, "Mitigation of losses from hydrodynamic mixing in a hydrogen bromine laminar flow battery." PhD thesis, Massachusetts Institute of Technology (2016).

Gong et al., "Exploiting immiscible aqueous-nonaqueous electrolyte interface toward a membraneless redox-flow battery concept." Journal of The Electrochemical Society (2017), vol. 164(12), p. A2590.

Goulet et al., "Co-laminar flow cells for electrochemical energy conversion." Journal of Power Sources (2014), vol. 260, pp. 186-196.

Hashemi, et al., "Membrane-less micro fuel cell based on two-phase flow." Journal of Power Sources (2017), vol. 348, pp. 212-218.

Holland-Cunz et al., "Redox flow batteries-concepts and chemistries for cost-effective energy storage." Frontiers in Energy (2018), vol. 12, pp. 198-224.

Huskinson et al., "A metal-free organic-inorganic aqueous flow battery." Nature (2014), vol. 505(7482), pp. 195-198.

Ibrahim et al., "Leveraging co-laminar flow cells for non-aqueous electrochemical systems." Journal of Power Sources (2018), vol. 402, pp. 7-14.

Ibrahim et al., "Microfluidics for electrochemical energy conversion." Chemical Reviews (2022), vol. 122(7), pp. 7236-7266.

Karakurt et al., "Membraneless microfluidic redox battery for wearable electronics applications." In 2017 19th International Conference on Solid-State Sensors, Actuators and Microsystems (Transducers), pp. 1820-1823. IEEE (2017).

Kjeang et al., "Microfluidic fuel cells: A review." Journal of Power Sources (2009), vol. 186(2), pp. 353-369.

Leung et al., "Membrane-less hybrid flow battery based on low-cost elements." Journal of Power Sources (2017), vol. 341, pp. 36-45.

Lisboa et al., "Mass transport enhancement in redox flow batteries with corrugated fluidic networks." Journal of Power Sources (2017), vol. 359, pp. 322-331.

Marma et al., "Membrane-less hydrogen iron redox flow battery." Journal of Electrochemical Energy Conversion and Storage (2019), vol. 16(1), p. 011005.

Marshewski et al., "Mixing with herringbone-inspired microstructures: Overcoming the diffusion limit in co-laminar microfluidic devices." Lab on a Chip (2015), vol. 15(8), pp. 1923-1933.

Marshewski et al., "On the mass transfer performance enhancement of membraneless redox flow cells with mixing promoters." International Journal of Heat and Mass Transfer (2017), vol. 106, pp. 884-894.

Da Mota et al., "Membraneless, room-temperature, direct borohydride/cerium fuel cell with power density of over 0.25 W/cm2." Journal of the American Chemical Society (2012), vol. 134(14), pp. 6076-6079.

Nasharudin et al., "Mass transfer and performance of membraneless micro fuel cell: A review." International Journal of Hydrogen Energy (2014), vol. 39(2), pp. 1039-1055.

Stroock et al., "Chaotic mixer for microchannels." Science (2002), vol. 295(5555), pp. 647-651.

(56) References Cited

OTHER PUBLICATIONS

Skyllas-Kazacos et al., "Progress in flow battery research and development." Journal of the Electrochemical Society (2011), vol. 158(8), p. R55.
Ronen et al., "Single-flow multiphase flow batteries: Theory." Electrochimica Acta (2021), vol. 389, p. 138554.
Ronen et al., "Theory of flow batteries with fast homogeneous chemical reactions." Journal of The Electrochemical Society (2018), vol. 165(16), p. A3820.
Ronen et al., "Single-flow multiphase flow batteries: Experiments." Journal of Power Sources (2022), vol. 540, p. 231567.
Salloum et al., "Counter flow membraneless microfluidic fuel cell." Journal of Power Sources (2010), vol. 195(19), pp. 6941-6944.
Salloum et al., "A membraneless microfluidic fuel cell stack." Journal of Power Sources (2011), vol. 196(3), pp. 1229-1234.
Shaegh et al., "A review on membraneless laminar flow-based fuel cells." International Journal of Hydrogen Energy (2011), vol. 36(9), pp. 5675-5694.
International Search Report and Written Opinion Re: Application No. PCT/US23/64769, prepared by the International Searing Authority, Oct. 12, 2023, pp. 1-49.
Office Action prepared by the Japanese Patent Office (JPO) for Japanese Patent Application No. 2024-556434, dated Sep. 24, 2025, pp. 1-8.
Alfisi et al., "Resistance breakdown of a membraneless hydrogen-bromine redox flow battery." ACS Sustainable Chemistry & Engineering (2022), vol. 10(39), pp. 12985-12992.
Yeo et al., "An electrochemically regenerative hydrogen-chlorine energy storage system: electrode kinetics and cell performance." Journal of Applied Electrochemistry (1980), vol. 10, pp. 393-404.
Charleston et al., "Hydrogen-bromine fuel cell advance component development." In National Technical Association Conference, No. NAS 1.15: 101345, 1988.
Cho et al., "High performance hydrogen/bromine redox flow battery for grid-scale energy storage." Journal of The Electrochemical Society (2012), vol. 159(11), p. A1806.
Cho et al., "Cyclic performance analysis of hydrogen/bromine flow batteries for grid-scale energy storage." ChemPlusChem (2015), vol. 80(2), pp. 402-411.
Dowd et al., "A study of alkaline-based H2-Br2 and H2-12 reversible fuel cells." Journal of The Electrochemical Society (2016), vol. 163(14), p. F1471.
Rugolo, "Electricity storage and the hydrogen-chlorine fuel cell." Harvard University (2011).
Kosek et al., "Advanced hydrogen electrode for hydrogen-bromine battery." In Space Electrochemical Research and Technology (SERT): Proceedings of a Conference Held at the NASA Lewis Research Center, Cleveland, Ohio, Apr. 14-16, 1987, vol. 2484, p. 127. National Aeronautics and Space Administration, Scientific and Technical (1987).
Vorotyntsev et al., "One-dimensional model of steady-state discharge process in hydrogen-bromate flow battery." Electrochimica Acta (2016), vol. 222, pp. 1555-1561.
Lin et al., "Advanced hydrogen-bromine flow batteries with improved efficiency, durability and cost." Journal of The Electrochemical Society (2015), vol. 163(1), p. A5049.
Livshits et al., "High-power H2/Br2 fuel cell." Electrochemistry Communications (2006), vol. 8(8), pp. 1358-1362.
Huskinson et al., "A high power density, high-efficiency hydrogen-chlorine regenerative fuel cell with a low precious metal content catalyst." Energy & Environmental Science (2012), vol. 5(9), pp. 8690-8698.
Anderson et al., "A high-performance hydrogen/chlorine fuel cell for space power applications." Journal of Power Sources (1994), vol. 47(3), pp. 321-328.
Park et al., "Electrospun Nafion®/polyphenylsulfone composite membranes for regenerative hydrogen bromine fuel cells." Materials (2016), vol. 9(3), p. 143.
Anderson et al., "A high-performance H2-C12 fuel cell for space power applications." In NASA Conference Publication (1993), pp. 243-243. NASA.
Yarlagadda et al., "A comprehensive study of an acid-based reversible H2-Br2 fuel cell system." Journal of The Electrochemical Society (2015), vol. 162(8), p. F919.
Wlodarczyk, "A 1D model of a hydrogen-bromine redox flow battery" (2018).
Tucker et al., "Impact of membrane characteristics on the performance and cycling of the Br2-H2 redox flow cell." Journal of Power Sources (2015), vol. 284, pp. 212-221.
Tucker et al.,"Optimization of electrode characteristics for the Br2/H2 redox flow cell." Journal of Applied Electrochemistry (2015), vol. 45, pp. 11-19.
Extended European Search prepared by the European Patent Office (EPO) for EP Application No. 23775846.1, dated Mar. 2, 2026, pp. 1-7.
Office action prepared by Ministry of Intellectual Property (MOIP) in Korea for Application No. KR 10-2024-7034794. dated May 14, 2026, pp. 1-12.

* cited by examiner 138
4
144
146
129
116
154
152
162
154
156
152
158
118
164
134
102
162
160
136
136
134
114
129
128
126
120
4

138
144
129
146
142
140
116
164
118
102

114
124
122
128
129
126
120

138
142
118
166
158
140
162
164
160
167
156
160
162
120

138
142
118
158
140
162
166
164
160
156
160
162
120

138
142
118
164
172
158
166
162
170
140
160
166
168
120

118
164
158
166
162
160
172
138
142
140
170
166
168
120

118
164
158
162
160
172
138
142
170
140
166
168
120

118
164
158
162
160
172
138
142
140
174
168
174
170
120

118
164
160
138
158
162
160
162
156
120

118
164
160
138
158
176
162
162
156
120

118
164
160
138
158
162
160
162
156
120

118
164
160
138
158
176
162
160
162
156
120

LIQUID MEMBRANE CELL ASSEMBLIES

CROSS-REFERENCE TO RELATED APPLICATIONS

This application claims the benefit of U.S. Provisional Patent Application No. 63/322,812 filed on Mar. 23, 2022 and entitled "Liquid Membrane Cell Assemblies." The complete disclosure of the above application is hereby incorporated by reference for all purposes.

BACKGROUND OF THE DISCLOSURE

Mixing chambers or membrane cells for fuel cells and flow batteries typically involve two chemicals separated by a semi-permeable membrane. The membrane must allow protons to pass through but force electrons to travel around the system, through an electrical load, to perform work. However, the semi-permeable membrane is generally the weak point of the above fuel cells and flow batteries because of their high costs, low life span, and limited performance.

Membraneless systems (sometimes referred to as "liquid membrane systems") eliminate the semi-permeable membrane and allow the fuel and electrolyte to flow alongside each other, with similar speeds to achieve minimal mixing, and then separated into different outlet ports once leaving the mixing cell or area. However, previous membraneless systems suffer from several problems. For example, electrolytes and fuel fluids can have more than minimal mixing resulting in a decrease in system efficiency and/or permanent damage to the catalyst. Additionally, in a bromine/hydrogen bromide membraneless cell, bromine is converted to hydrogen bromide along the cathode surface (where electrons are available) resulting in a physical and electrical barrier to the remaining bromine in the fluid flow that makes further conversion of fuel more difficult. Moreover, as fluids move through a liquid membrane cell, perturbations (whether deliberately instigated or not) can begin to dominate motion resulting in a decrease in effectiveness of the cell and/or mixing between the fuel and electrolyte fluids.

Furthermore, chemically measuring the state of the transition of the fuel conversion (or reversal in the charging state) may be difficult, expensive, and inaccurate, particularly for a fully automated system, such as a flow battery. Without the above information, the primary measurement of state of charge (SoC) is the flow of electricity to/from the cell during use. However, such measurement combines several factors, each of which would be beneficial to know independently to more efficiently and effectively track performance of the system (e.g., degradation) and to perform real time system modifications for efficiency. Additionally, the materials used for membraneless systems are costly.

What is therefore desired are membraneless cell assemblies that minimize mixing of the electrolyte and fuel fluid(s), increase fuel conversion per unit length of the mixing chamber, increase amount of electrical power delivered per unit length of the mixing chamber, reduce the amount of electrical resistance across the mixing chamber, maintain laminar flow in the mixing cell or area, provide real-time measurement of state of charge, and economically and efficiently use reactant materials.

DETAILED DESCRIPTION OF THE DISCLOSURE

Figure 1:
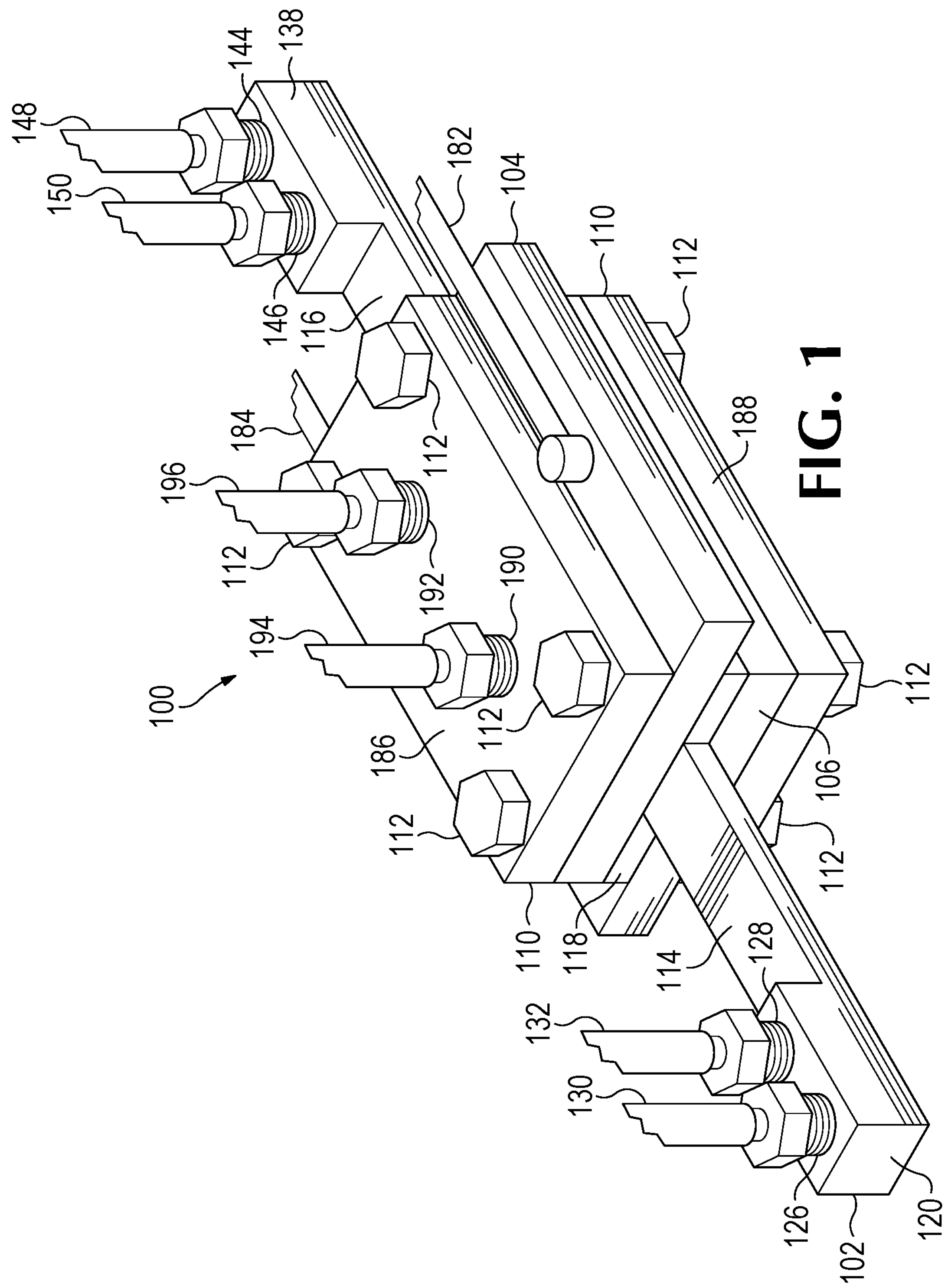
FIG. 1 is an isometric view of an example of a liquid membrane cell assembly of the present disclosure.
Figure 2:
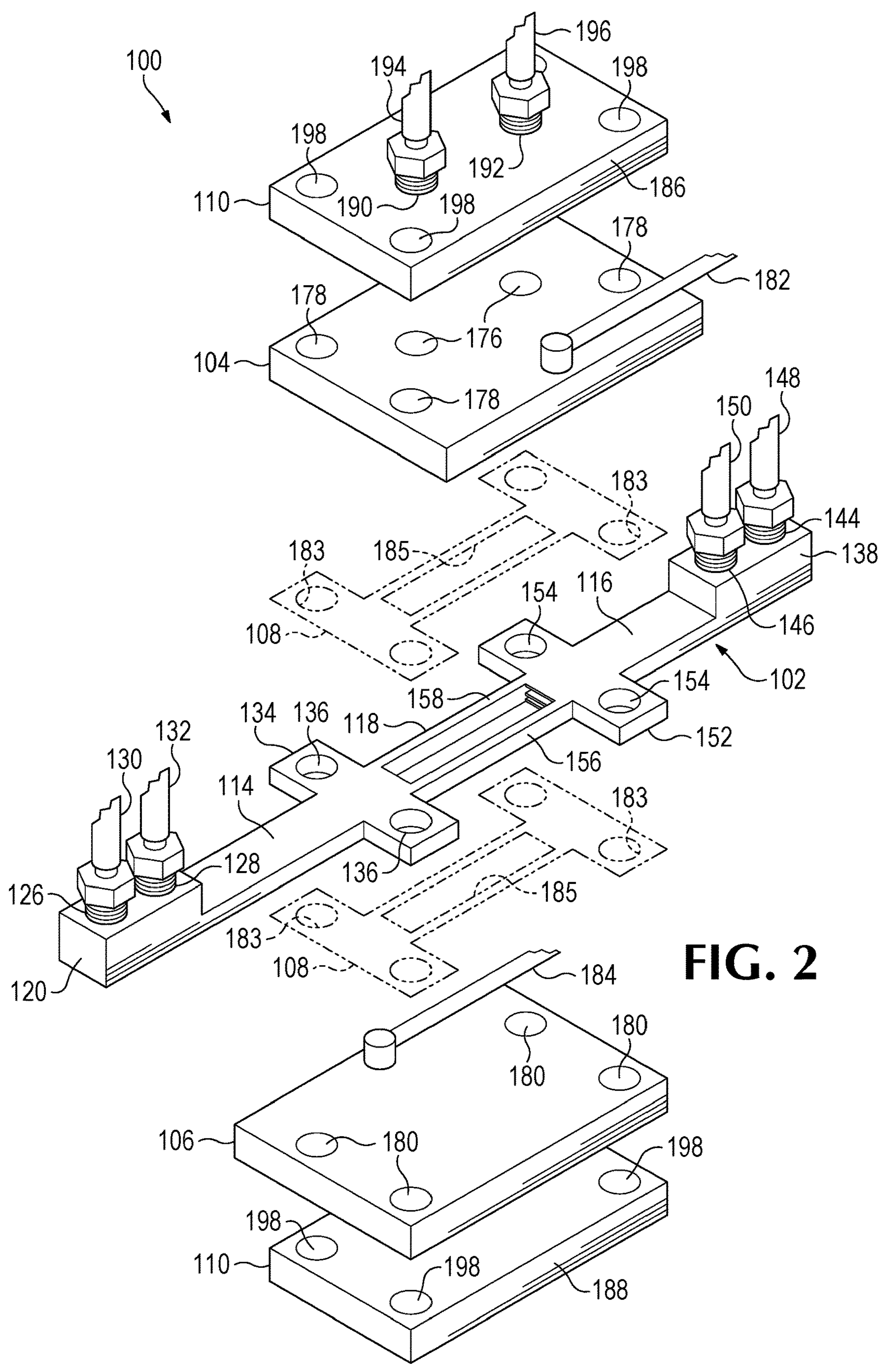
FIG. 2 is an exploded view of the liquid membrane cell assembly of FIG. 1, excluding fasteners shown in FIG. 1.

Referring to FIGS. 1-4, an example of a liquid membrane cell assembly 100 is shown. The liquid membrane cell assembly includes a frame, skeleton, or base 102, an anode or anode plate 104, a cathode or cathode plate 106, sealing gaskets 108, end plates 110, and fasteners 112.

Unless explicitly excluded, base 102 may additionally, or alternatively, include one or more components and/or structures of other bases of the present disclosure. Base 102 includes an inlet end portion 114, an outlet end portion 116, and a central portion 118 disposed between the inlet and outlet end portions. The portions may be attached to each other and/or formed with each other. In the example shown in FIGS. 1-4, base 102 is elongate and is a unitary piece manufactured, for example, via 3D printing and/or mold injection. However, other examples of base 102 may include non-elongate shapes and/or may be manufactured via any suitable other methods. Base 102 may be made of any suitable material(s), such as one or more plastic materials (e.g., polyvinylidene fluoride or polyvinylidene difluoride).

Inlet end portion 114 includes an inlet body 120 having a fuel inlet channel 122 and an electrolyte inlet channel 124 within the inlet body. The fuel channel and the electrolyte inlet channel are separate and distinct from each other. In other words, the fuel inlet channel and the electrolyte inlet channel are not fluidly connected within inlet end portion 114. In the example shown in FIGS. 1-4, fuel inlet channel and electrolyte inlet channel are planar and parallel and/or co-axial to each other. Other examples of inlet end portion 114 may, however, include fuel and electrolyte channels that are not planar, parallel, and/or co-axial to each other.

Inlet body 120 also includes a fuel inlet port 126 and an electrolyte inlet port 128, which are accessible external the inlet body. Fuel inlet port 126 is fluidly connected to fuel inlet channel 122 but not to electrolyte inlet channel 124, while electrolyte inlet port 128 is fluidly connected to electrolyte inlet channel 124 but not to fuel inlet channel 122. Fuel inlet port 126 and electrolyte inlet port 128 are separate and distinct from each other. In other words, fuel inlet port 126 and electrolyte inlet port 128 are not fluidly connected to each other. In the example shown in FIGS. 1-4, fuel inlet port 126 and electrolyte inlet port 128 are perpendicular to fuel inlet channel 122 and electrolyte inlet channel 124. However, other examples of fuel inlet port 126 and/or electrolyte inlet port 128 may be non-perpendicular to the fuel and electrolyte inlet channels. Fuel inlet port 126 and/or electrolyte inlet port 128 include threads 129 and/or other connection structures that allow connection to an electrolyte inlet conduit 130 and a fuel inlet conduit 132, respectively. Those conduits may be connected to supply containers and/or tanks and/or upstream liquid membrane cell assemblies. Additionally, inlet body 120 includes flange portions 134 having apertures 136 to receive fasteners 112. In the example shown in FIGS. 1-4, the fuel inlet port and electrolyte inlet port are positioned adjacent one end of inlet body 120 and flange portions 134 are positioned adjacent the opposed end of the inlet body and adjacent central portion 118.

Figures 3, 4:
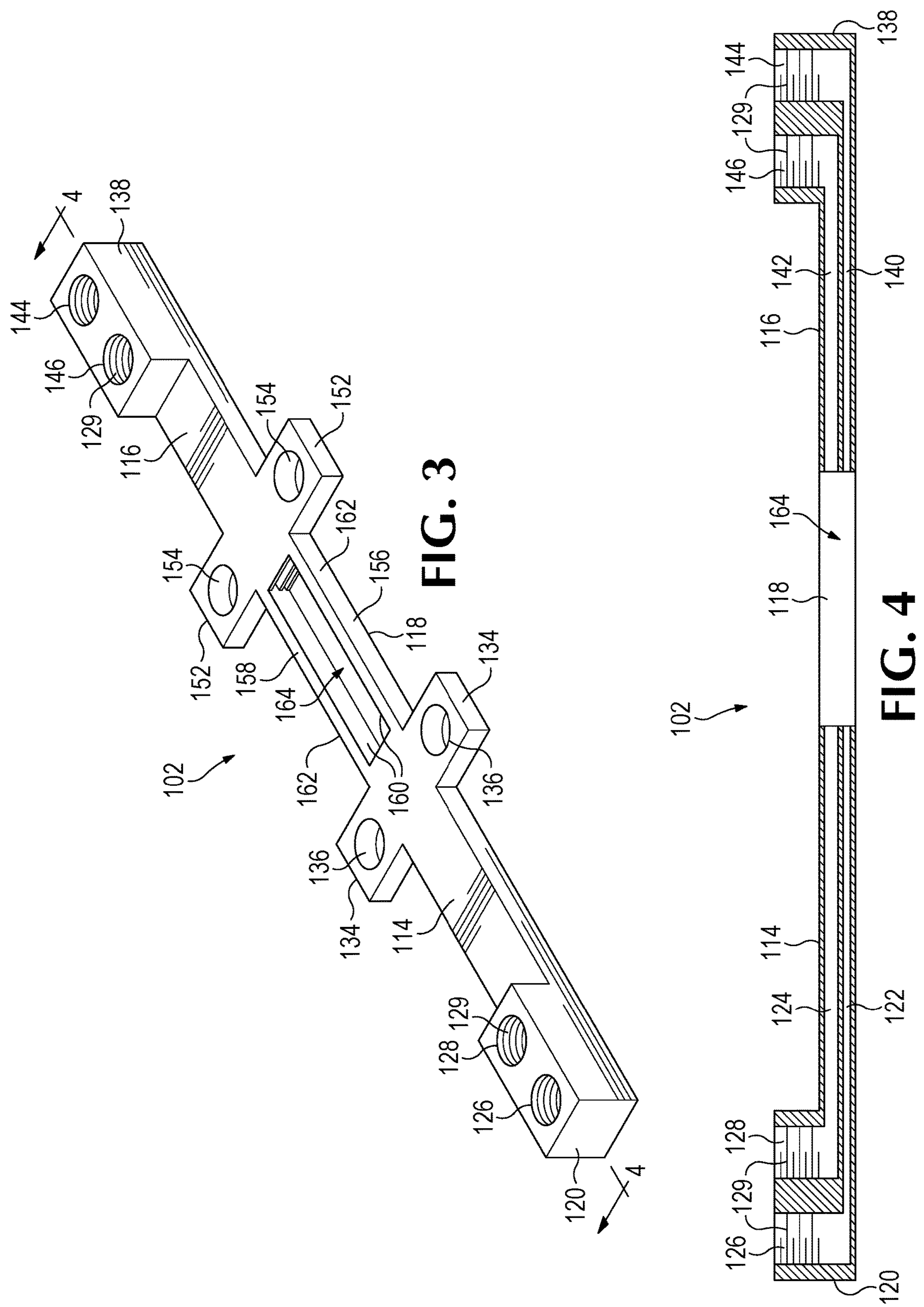
FIG. 3 is an isometric view of an example of a base of the liquid membrane cell assembly of FIG. 1.
FIG. 4 is a sectional view of the base of FIG. 3 taken along lines 4-4 in FIG. 3.

Similarly, outlet end portion 116 includes an outlet body 138 having a fuel outlet channel 140 and an electrolyte outlet channel 142 within the outlet body. The fuel outlet channel and the electrolyte outlet channel are separate and distinct from each other. In other words, the fuel outlet channel and the electrolyte outlet channel are not fluidly connected within outlet end portion 116. In the example shown in FIGS. 1-4, fuel outlet channel 140 and electrolyte outlet channel 142 are planar, parallel, and/or co-axial to each other. Other examples of outlet end portion 116 may, however, include electrolyte and outlet channels that are not planar, parallel, and/or co-axial to each other. Additionally, as best shown in FIG. 4, fuel inlet channel 122 and fuel outlet channel 140 are aligned with each other and/or are co-planar and/or co-axial. Similarly, electrolyte inlet channel 124 and electrolyte outlet channel 142 are aligned with each other and/or are co-planar and/or co-axial.

Outlet body 138 also includes a fuel outlet port 144 and an electrolyte outlet port 146, which are accessible external the outlet body. Fuel outlet port 144 is fluidly connected to fuel outlet channel 140 but not fluidly connected to electrolyte outlet channel 142, while electrolyte outlet port 146 is fluidly connected to electrolyte outlet channel 142 but not fluidly connected to fuel outlet channel 140. Fuel outlet port 144 and electrolyte outlet port 146 are separate and distinct from each other. In other words, fuel outlet port 144 and electrolyte outlet port 146 are not fluidly connected to each other. In the example shown in FIGS. 1-4, fuel outlet port 144 and electrolyte outlet port 146 are perpendicular to fuel outlet channel 140 and electrolyte outlet channel 142. However, other examples of the fuel and electrolyte outlet ports may be non-perpendicular to the fuel and electrolyte outlet channels. Fuel outlet port 144 and/or electrolyte outlet port 146 include threads 129 and/or other connection structures that allow connection to a fuel outlet conduit 148 and an electrolyte outlet conduit 150, respectively. Those conduits may be connected to output containers and/or tanks and/or downstream liquid membrane cell assemblies. Additionally, outlet body 138 includes flange portions 152 having apertures 154 to receive fasteners 112. In the example shown in FIGS. 1-4, the electrolyte outlet port and fuel outlet port are positioned adjacent one end of outlet body 138 and flange portions 152 are positioned adjacent the opposed end of the outlet body and adjacent central portion 118.

Central portion 118 includes a proximal bridge member 156 and a distal bridge member 158. The proximal and distal bridge members are spaced and opposed from each other. Proximal bridge member 156 and distal bridge member 158 connect inlet body 120 and outlet body 138. In the example shown in FIGS. 1-4, only the proximal and distal bridge members connect the inlet and outlet bodies. The proximal bridge member and distal bridge member each includes an inner wall 160 and an outer wall 162 opposed the inner wall. The inner walls of the bridge members face each other, while the outer walls face away from each other. Inlet body 120, outlet body 138, proximal bridge member 156, and distal bridge member 158 collectively and define (or horizontally define) a single mixing, reaction, or open area 164 therebetween. In other words, the borders of open area 164 are formed by proximal bridge member 156 and distal bridge member 158 and by inlet body 120 and outlet body 138. Open area 164 fluidly connects the electrolyte inlet channel and fuel inlet channel of the inlet end portion with the electrolyte outlet channel and fuel outlet channel of the outlet end portion. In other words the electrolyte input and fuel inlet channels are fluidly connected to the electrolyte output and fuel outlet channels only through the open area.

Figures 5, 6, 7:
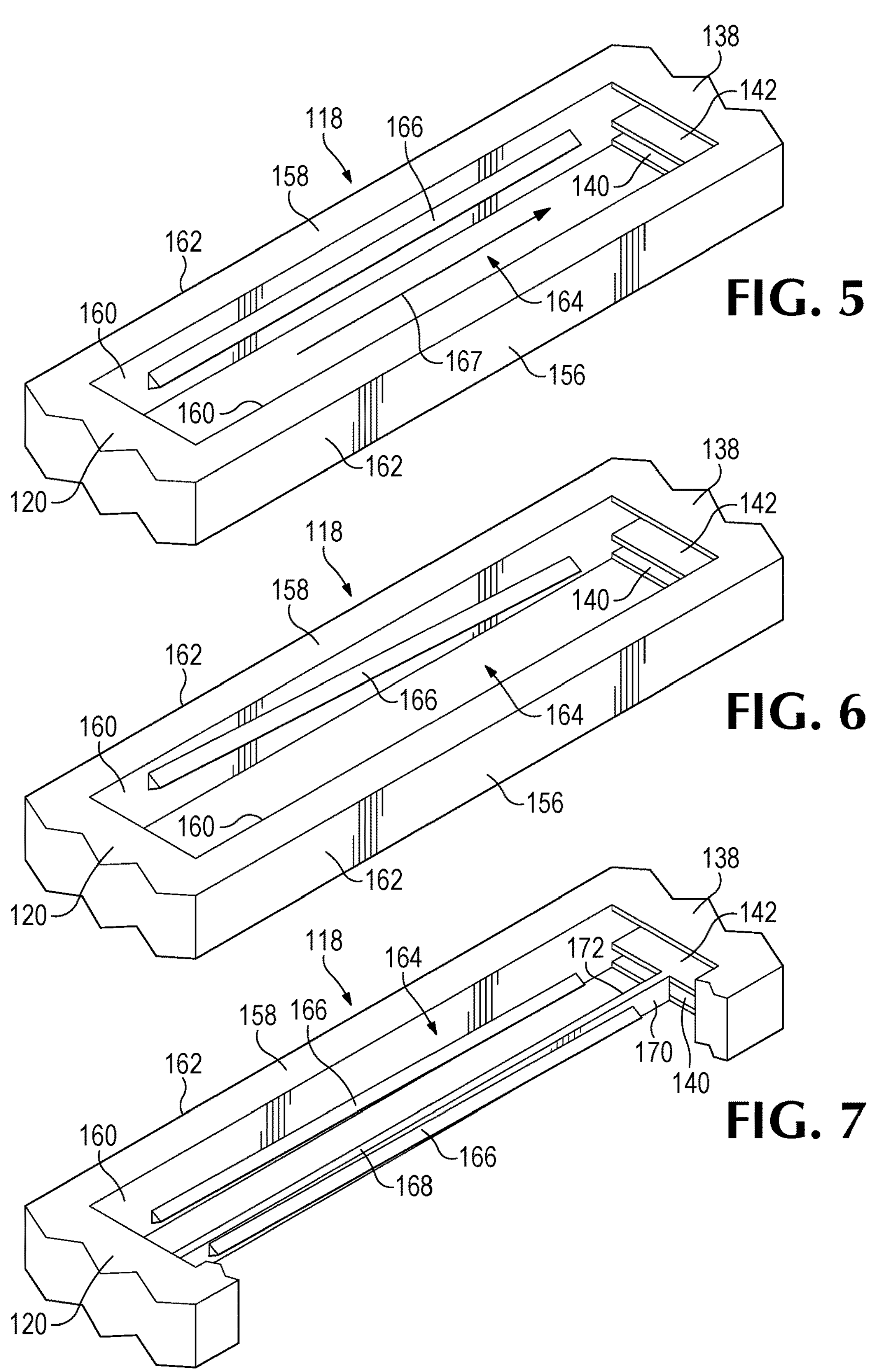
FIG. 5 is a partial isometric view of the base of FIG. 3 showing an example of a mixing wing.
FIG. 6 is a partial isometric view of the base of FIG. 3 showing another example of a mixing wing.
FIG. 7 is a partial isometric view of the base of FIG. 3 showing an example of a central bridge member having a mixing wing.
Figures 8, 9, 10:
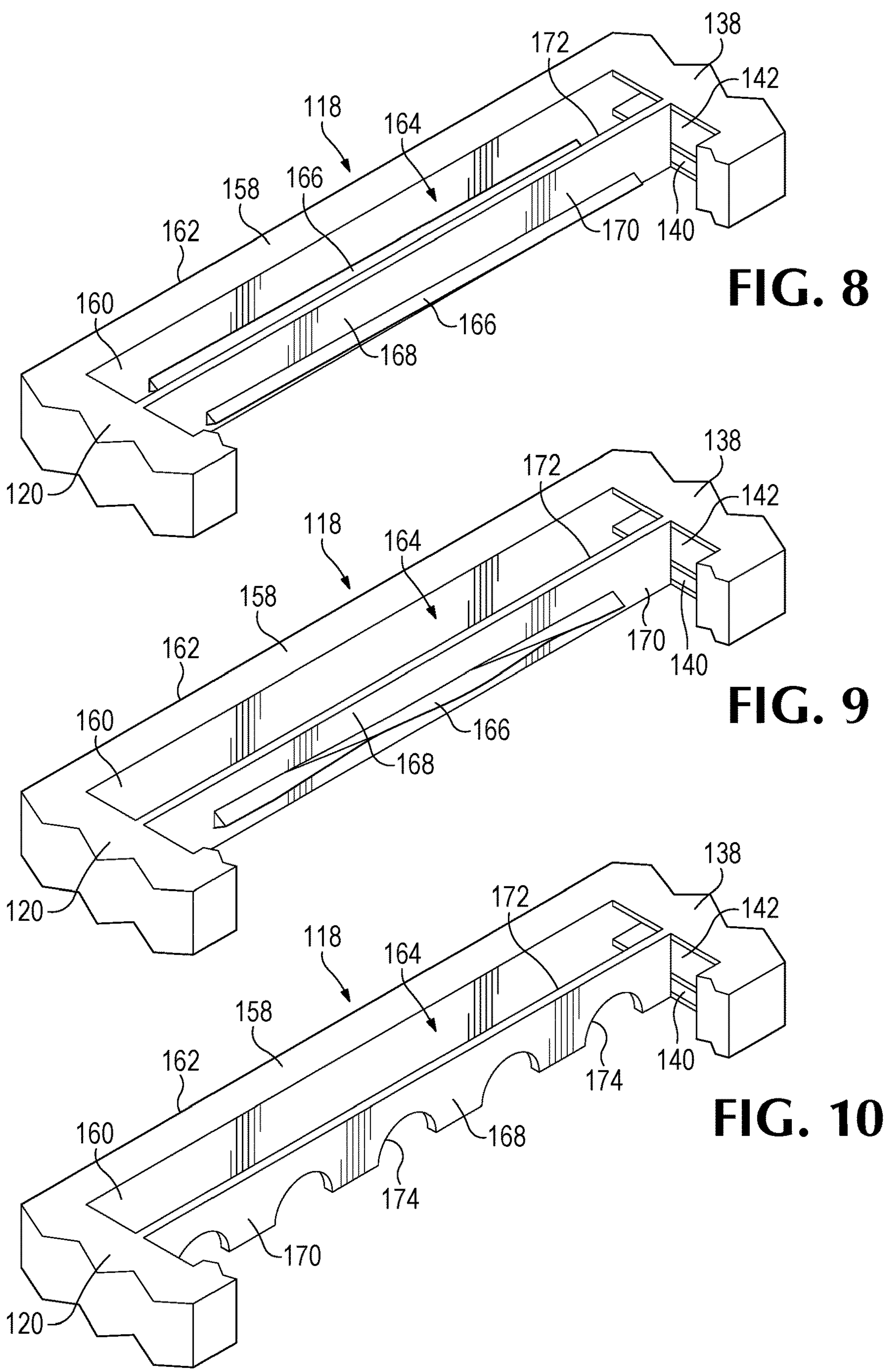
FIG. 8 is a partial isometric view of the base of FIG. 3 showing an alternative example of a central bridge member having a mixing wing.
FIG. 9 is a partial isometric view of the base of FIG. 8 showing an alternative example of a central bridge member having a mixing wing.
FIG. 10 is a partial isometric view of the base of FIG. 8 showing a further example of a central bridge member having cut-outs.

Referring to FIGS. 5-9, central portion 118 may, in some examples, include one or more mixing projections, guiding projections, or mixing wings 166 attached to, or formed with, one or more internal wall 160. The mixing wings facilitate desired movement of fluids, such as to direct fuel rich regions to the cathode and/or maintain a non-mixing line between the fuel and the electrolyte. The mixing wings may extend horizontally or parallel to fluid flow at 167 (and/or parallel to the channels of the inlet and/or outlet end portions) as shown in FIG. 5, and/or slope up and/or down in the fluid flow direction (and/or not parallel to the channels of the inlet and/or outlet end portions). An example of a mixing wing 166 sloping downward relative to fluid flow 167 is shown in FIG. 6. The wings may span or substantially span the full length of open area 164 or may span one or more portions of the open area (e.g., intermittent small sections spaced across the length of the open area). The wings may be any suitable shape(s). For example, one or more of the wings may be shaped as a triangular wedge or triangular prism, as shown in FIGS. 5-8. Alternatively, or additionally, one or more of the wings may be a series of joined triangular prisms that may twist or rotate about the longitudinal axis of the triangular prisms as shown in FIG. 9. Other examples of shapes include curved sheets/planes and/or small hollow tubes.

Referring to FIGS. 7-10, central portion 118 may, in some examples, include one or more internal or central bridge members 168 that are spaced from and disposed between proximal bridge member 156 and distal bridge member 158. The central bridge members facilitate desired movement of fluids, such as to direct fuel rich regions to the cathode and/or maintain a non-mixing line between the fuel and the electrolyte. Similar to the proximal and distal bridge members, the central bridge members connect inlet body 120 and outlet body 138. The central bridge members are attached to, or formed with, one or more ends of the channels and/or the base of the inlet and/or outlet end portions).

Central bridge members 168 each includes a proximal wall 170 and a distal wall 172 opposed the proximal wall. The central bridge members may be planar and/or parallel to the proximal and/or distal bridge members. Additionally, central bridge members 168 may be the same height as the proximal and/or distal bridge members (measured perpendicular to the flow direction) or may have a height that is smaller or less than the height of the proximal and/or distal bridge members (e.g., 40%, 50%, or 60% height of the proximal and/or bridge members). When the central bridge member(s) are the same or substantially the same height as the proximal and/or distal bridge members, open area 164 is subdivided into two or more open or mixing areas that are separate and distinct from each other. In other words, the two or more open areas are not fluidly connected to each other. In contrast, when the central bridge member(s) are less or substantially less than the height of the proximal and/or distal bridge members, fluids can flow from one side of the central bridge member(s) to an opposite side of those members within the open area. Additionally, one or both walls of the central bridge members may have one or more mixing wings 166 as shown in FIGS. 7-9. Moreover, the central bridge members may have apertures, cutouts, or cut throughs 174 as shown in FIG. 10 to allow for horizontal fluid flow and for creating localized perturbations to bring fuel rich portions of the fluid to the cathode surface.

Figures 11, 12, 13, 14:
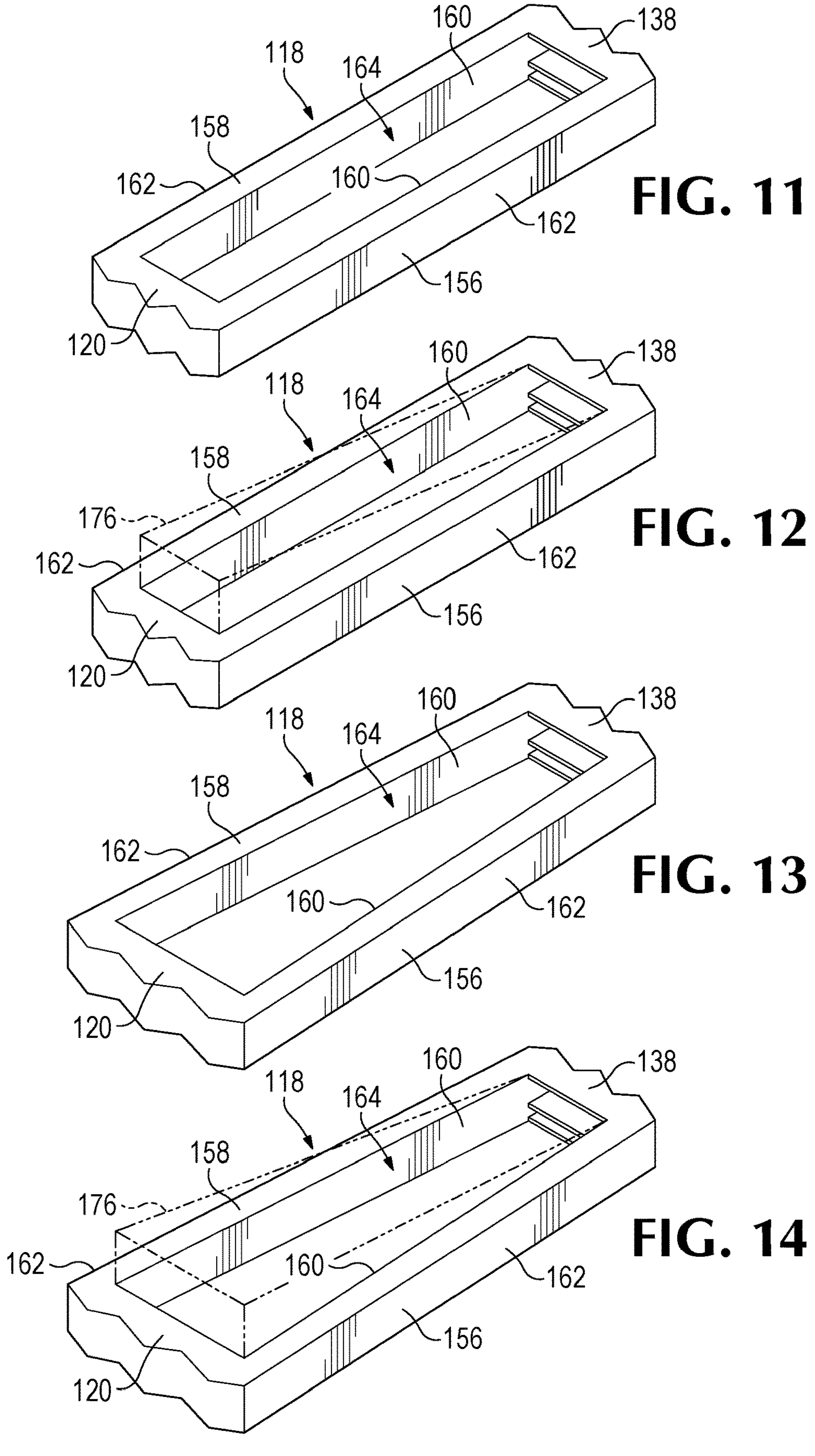
FIG. 11 is a partial isometric view of the base of FIG. 3 showing an example of proximal and distal bridge members connecting inlet and outlet bodies of the base.
FIG. 12 is a partial isometric view of the base of FIG. 11 showing an example of an anode having a cavity to provide a larger mixing area.
FIG. 13 is a partial isometric view of the base of FIG. 11 showing another example of first and second bridge members connecting inlet and outlet bodies of the base to provide a larger mixing area.
FIG. 14 is a partial isometric view of the base of FIG. 13 showing an example of an anode having a cavity to provide a larger mixing area.

Referring to FIGS. 11-14, proximal bridge member 156, distal bridge member 158, and/or anode 104 may be configured to provide a suitable volume and/or shape open area 164 to promote or facilitate laminar flow of fuel and/or electrolyte in the open area. The open area has a nominal volume with a rectangular prism shape when proximal bridge member 156 and distal bridge member 158 are parallel to each other and perpendicular to inlet body 120 and outlet body 138 as shown in FIG. 11. When anode 104 includes a cavity 176 as shown in FIG. 12, open area 164 has a volume larger than the nominal volume and a trapezoidal prism shape, which results vertical compression in the fluid flow direction.

When proximal bridge member 156 and distal bridge member 158 are not parallel to each other, not perpendicular to the inlet and outlet bodies, and are spaced apart further at inlet body 120 relative to the example in FIG. 11 but then converge from inlet body 120 to outlet body 138, open area 164 has a volume larger than the nominal volume and a trapezoidal prism shape as shown in FIG. 13, which results in horizontal compression in the fluid flow direction. When anode 104 includes cavity 176 and proximal bridge member 156 and distal bridge member 158 are not parallel to each other, not perpendicular to the inlet and outlet bodies, and are spaced apart further at inlet body 120 relative to the example in FIG. 11 but then converge from inlet body 120 to outlet body 138, open area 164 has a volume larger than the examples in FIG. 11-13 and a trapezoidal prism shape as shown in FIG. 14, which results in both vertical and horizontal compression in the fluid flow direction. The proximal and distal bridge members may be shaped via subtractive manufacturing techniques. Additionally, the anode and/or cathode plates may be rotated to provide the desired mixing cell shape. The anode and/or cathode plates may be shaped via subtractive manufacturing techniques, such as via a CNC carver or equivalent. Although modifications to the open area is discussed, the same or similar modifications may be made to one or more of the channels of the inlet and/or outlet end portions.

Figures 15, 16:
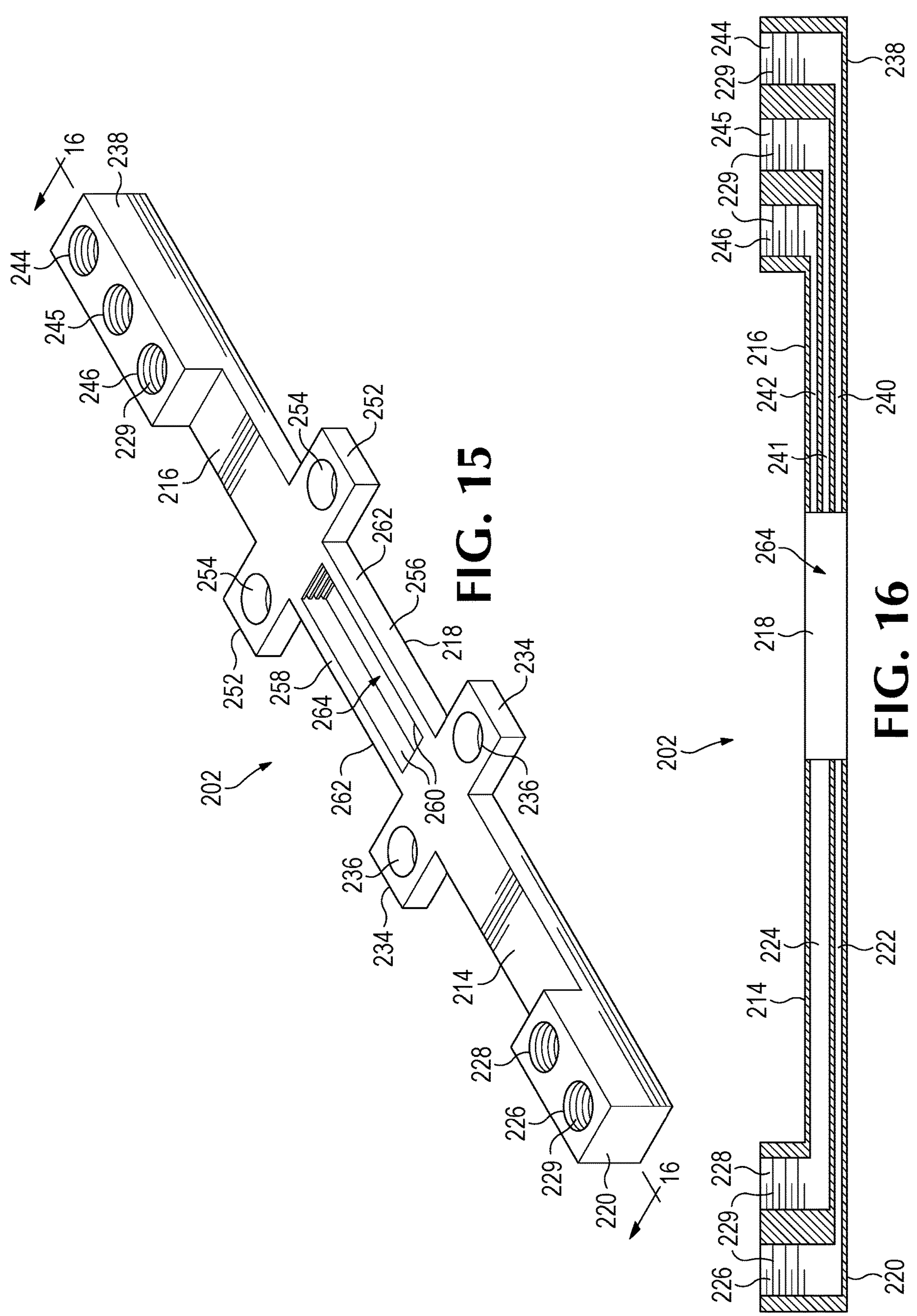
FIG. 15 is an isometric view of another example of a base of the liquid membrane cell assembly of FIG. 1.
FIG. 16 is a sectional view of the base of the liquid membrane cell assembly of FIG. taken along lines 16-16 in FIG. 15.

Referring to FIGS. 15-16, an alternative example of base 102 is shown and is generally indicated at 202. Unless explicitly excluded, base 202 may additionally, or alternatively, include one or more components and/or structures of other bases of the present disclosure. Similar to base 102, base 202 includes an inlet end portion 214, an outlet end portion 216, and a central portion 218 disposed between the inlet and outlet end portions. The portions may be attached to each other and/or formed with each other. In the example shown in FIGS. 15-16, base 202 is elongate and is a unitary piece manufactured, for example, via 3D printing and/or mold injection. However, other examples of bases 202 may include non-elongate shapes and/or may be manufactured via other suitable methods. Base 102 may be made of any suitable material(s), such as one or more plastic materials (e.g., polyvinylidene fluoride or polyvinylidene difluoride).

Inlet end portion 214 is the same or substantially the same as inlet end portion 114. For example, inlet end portion 214 includes an inlet body 220 having a fuel inlet channel 222 and an electrolyte inlet channel 224 within the inlet body. Inlet body 220 also includes a fuel inlet port 226 and an electrolyte inlet port 228, which are accessible external the inlet body. Fuel input 226 port is fluidly connected to fuel inlet channel 222 but is not fluidly connected to electrolyte inlet channel 224, while electrolyte inlet port 228 is fluidly connected to electrolyte inlet channel 224 but is not fluidly connected to fuel inlet channel 222. Fuel inlet port 226 and/or electrolyte inlet port 228 include threads 229 and/or other connection structures that allow connection to an electrolyte inlet conduit and a fuel inlet conduit (not shown), respectively. Those conduits may be connected to supply containers and/or tanks and/or upstream liquid membrane cell assemblies. Additionally, inlet body 220 includes flange portions 234 having apertures 236 to receive fasteners (not shown).

Similarly, outlet end portion 216 includes an outlet body 238. However, unlike outlet body 138, outlet body 238 includes a fuel outlet channel 240, a mixed electrolyte outlet channel 241, and an electrolyte outlet channel 242 within the outlet body. The electrolyte outlet channel, mixed electrolyte outlet channel, and the fuel outlet channel are separate and distinct from each other. In other words, the electrolyte outlet channel, mixed electrolyte outlet channel, and the fuel outlet channel are not fluidly connected within outlet end portion 216. The outgoing pure electrolyte from the electrolyte outlet port can be looped immediately back into the liquid membrane cell assembly for use. The mixed electrolyte from the mixed electrolyte port may be contaminated with fuel and is processed before being returned back into the liquid membrane cell assembly.

Examples of processing of the mixed electrolyte include feeding the mixed electrolyte into the main fuel line for later use, running the mixed electrolyte through a liquid membrane cell in a discharging state to convert the existing fuel to electrolyte to restore purity, and/or one or more physical processes to separate the fuel and the electrolyte (e.g., distillation or density separation from spinning).

In the example shown in FIGS. 15-16, fuel inlet channel 240, mixed electrolyte outlet channel 241, and electrolyte outlet channel 242 are planar and parallel to each other. Other examples of outlet end portion 216 may, however, include fuel and electrolyte outlet channels that are not planar and/or parallel to each other. Additionally, as best shown in FIG. 16, electrolyte inlet channel 224 and electrolyte outlet channel 242 are aligned with each other and/or are co-planar and/or co-axial. However, fuel inlet channel 222 is aligned and/or is coplanar and/or co-axial with both fuel outlet channel 240 and mixed electrolyte outlet channel 241.

Outlet body 238 also includes a fuel outlet port 244, a mixed electrolyte outlet port 245, and an electrolyte outlet port 246, which are accessible external the outlet body. Fuel outlet port 244 is fluidly connected to fuel outlet channel 240 but not mixed electrolyte channel 241 and electrolyte outlet channel 242, mixed electrolyte outlet port 245 is fluidly connected to mixed electrolyte outlet channel 241 but not fluidly connected to fuel outlet channel 240 and electrolyte outlet channel 242, and electrolyte outlet port 246 is fluidly connected to electrolyte outlet channel 242 but not fluidly connected to fuel outlet channel 240 and mixed electrolyte outlet channel 241. The fuel, mixed electrolyte, and electrolyte outlet ports are separate and distinct from each other and are not fluidly connected to each other. Additionally, the fuel, mixed electrolyte, and electrolyte outlet ports are perpendicular to the fuel and electrolyte outlet channels but may, in other examples, be non-perpendicular. Fuel outlet port 244, mixed electrolyte outlet port 245, and/or electrolyte outlet port 246 include threads 229 and/or other connection structures that allow connection to an electrolyte outlet conduit, a mixed electrolyte outlet conduit, and a fuel outlet conduit (not shown), respectively. Those conduits may be connected to output containers and/or tanks and/or downstream liquid membrane cell assemblies. Additionally, outlet body 238 includes flange portions 252 having apertures 254 to receive fasteners (not shown). In the example shown in FIGS. 15-16, the electrolyte outlet port, mixed electrolyte outlet port, and fuel outlet port are positioned adjacent one end of outlet body 238 and flange portions 252 are positioned adjacent the opposed end of the outlet body and adjacent central portion 218.

Central portion 218 includes a proximal bridge member 256 and a distal bridge member 258. The proximal and distal bridge members are spaced and opposed from each other. Proximal bridge member 256 and distal bridge member 258 connect inlet body 220 and outlet body 238. The proximal bridge member and distal bridge member each includes an inner wall 260 and an outer wall 262 opposed the inner wall. The inner walls of the bridge members face each other, while the outer walls face away from each other. Inlet body 220, outlet body 238, proximal bridge member 256, and distal bridge member 258 collectively and define (or horizontally define) a single mixing, reaction, or open area 264 therebetween. Open area 264 fluidly connects the electrolyte inlet channel and fuel inlet channel of the inlet end portion with the electrolyte outlet channel, mixed electrolyte outlet channel, and fuel outlet channel of the outlet end portion. Referring back to FIGS. 1-4, anode or anode plate 104 is adjacent central portion 118 and flange portions 134 and 152 of the inlet and outlet end portions. Similarly, cathode or cathode plate 106 is adjacent central portion 118 and flange portions 134 and 152 of the inlet and outlet end portions such that base 102 is disposed between the anode and the cathode. In the configuration shown in FIGS. 1-4, anode 104 is supported on the central portion 118 and flange portions 134 and 152, while cathode 106 supports the above components including the anode. Alternatively, the configuration may be reversed with the cathode being supported by other components and the anode supporting those components. In yet another configuration, the components may be on their sides with neither the anode nor the cathode supporting any of the other components.

Additionally, anode 104 includes fluid openings 176 for reactant gas (e.g., hydrogen) and apertures 178 to receive fasteners 112. However, anode 104 may be porous and the anode may exclude or be free from the fluid openings. Similarly, cathode 106 includes apertures 180 to receive fasteners 112. Additionally, wiring 182 is attached (or electrically attached) to the anode and wiring 184 is attached (or electrically attached) to the cathode. Anode 104 and cathode 106 may be any suitable shape(s) and may be made of suitable material(s). For example, the anode and cathode may be graphite carbon plates that are rectangular prism shape. Anode 104 and cathode 106 vertically define open area 164 therebetween. In other words, the vertical borders of open area 164 are formed by the inner walls of anode 104 and cathode 106. Therefore, anode 104, cathode 106, inlet body 120, outlet body 138, proximal bridge member 156, and distal bridge member 158 collectively define open area 164 therebetween. As discussed above, anode 104 and/or cathode 106 may sometimes include a cavity, such as cavity 176, to increase the volume and/or change the shape of open area 164. In other words, the cavity of the anode and/or cathode, partially defines open area 164.

In some examples, sealing gaskets 108 may be used between the anode/cathode and the base. The sealing gaskets may be made of any suitable materials, such as carbon paper. Sealing gaskets 108 includes apertures 183 to receive fasteners 112. End plates 110 include an anode end plate 186 and a cathode end plate 188. The anode end plate is adjacent to and supported on anode 104. Anode end plate 186 includes a reactant inlet port 190 and a reactant outlet port 192, which are fluidly connected to the anode and/or the fluid ports of the anode. The reactant inlet and outlet ports may include threads and/or other connection structures that allow connection to a reactant inlet conduit 194 and a reactant outlet conduit 196, respectively. Those conduits may be connected to supply containers and/or tanks. The cathode end plate is adjacent to and supports cathode 106 and the other components of the liquid membrane cell assembly. The end plates may be made of any suitable materials, such as compression acrylic plates. Fasteners 112 are received in apertures of the anode, cathode, sealing gaskets (when used), and base to urge and secure the end plates toward each other to connect the components of the liquid membrane cell assembly and create a fluid-tight seal.

Figure 17:
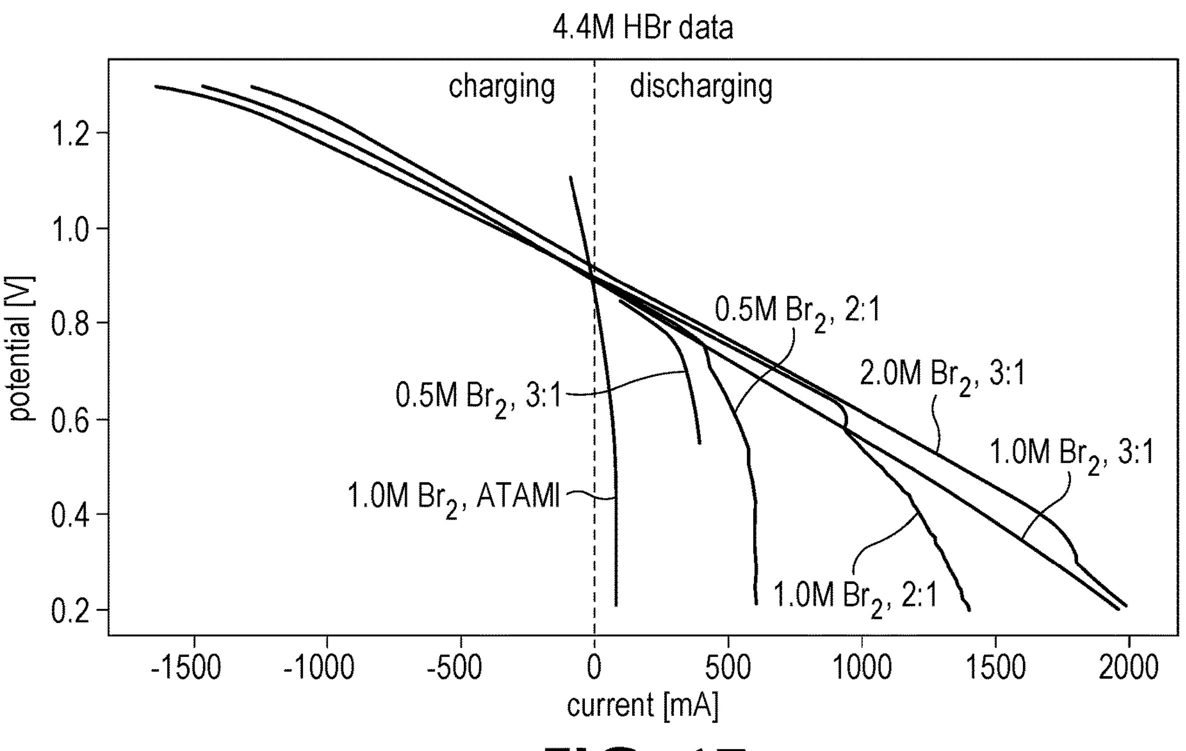
FIG. 17 is a graph of electrical output of various examples of the liquid membrane cell assembly of FIG. 1.

Referring to FIG. 17, a graph showing illustrative electrical outputs of the liquid membrane cell assemblies of the present disclosure when hydrogen bromide is the electrolyte, bromine ($Br_2$) is the fuel, and hydrogen gas is the reactant. Negative current represents charging of the system (on left side of graph), while positive currents are the discharge state (on right side of graph). The data is presented for different concentrations of $Br_2$ fuel (0.5 M, 1.0 M, and 2.0 M) and different ratios of the vertical height of the electrolyte channel vs the fuel channel in mm (e.g., 3:1=3 mm tall electrolyte channel and 1 mm tall fuel channel).

Figure 18:
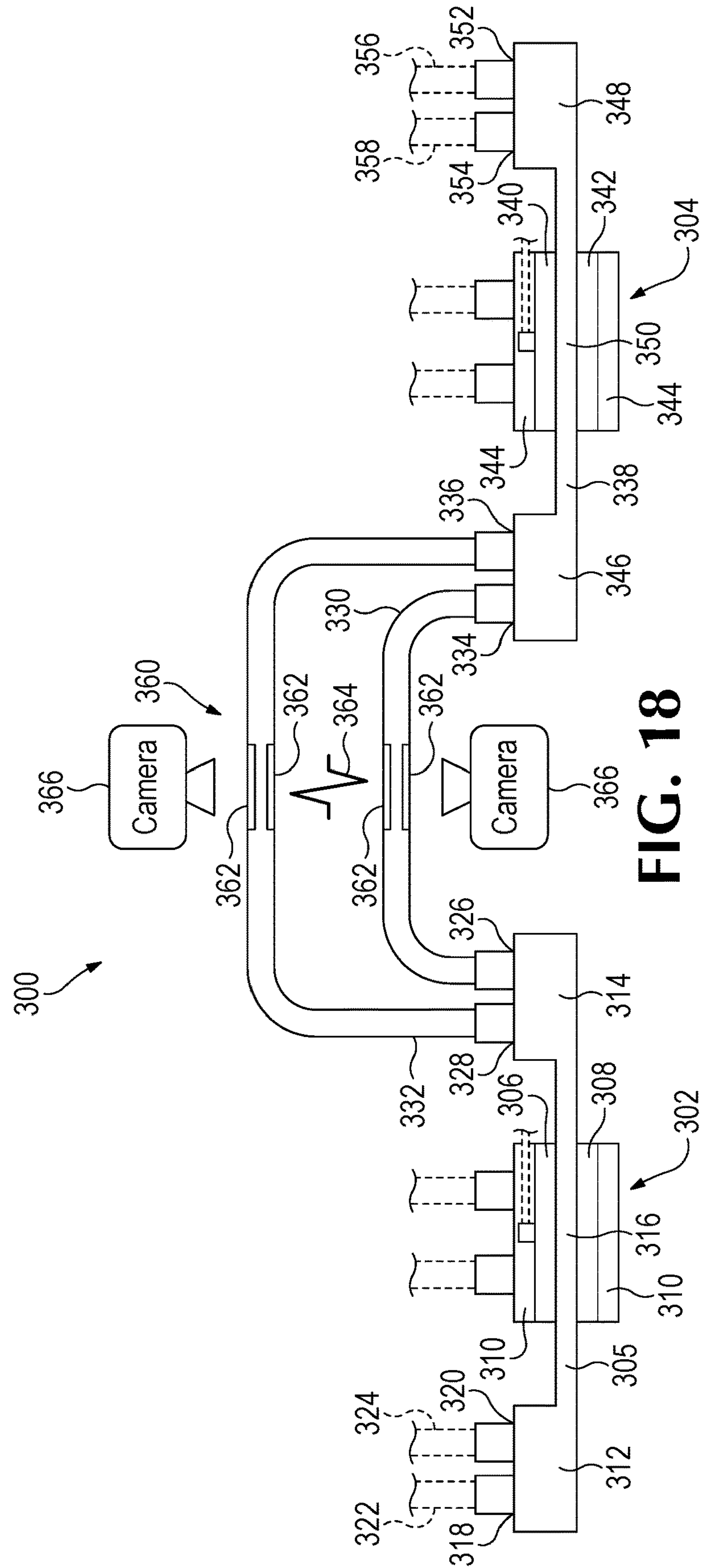
FIG. 18 is an example of two liquid membrane cell assemblies of FIG. 1 connected in series with an example of a state of charge measurement assembly.

Referring to FIG. 18, a system 300 having a first liquid membrane cell assembly 302 connected in series with a second liquid membrane cell assembly 304 is shown. The first and second liquid membrane cell assemblies may include one or more components and/or one or more structures of other liquid membrane cell assemblies of the present disclosure. The first liquid membrane cell assembly includes a base 305, an anode 306, a cathode 308, and end plates 310. The base includes an inlet end portion 312, an outlet end portion 314, and a central portion 316 disposed between the inlet and outlet end portions. Inlet end portion 312 includes a fuel inlet port 318 and an electrolyte inlet port 320. Fuel inlet port 318 and/or electrolyte inlet port 320 include threads and/or other connection structures that allow connection to a fuel inlet conduit 322 and an electrolyte inlet conduit 324, respectively. Those conduits may be connected to supply containers and/or tanks and/or upstream liquid membrane cell assemblies. Outlet end portion 314 includes a fuel outlet port 326 and an electrolyte outlet port 328. Fuel outlet port 326 and/or electrolyte outlet port 328 include threads and/or other connection structures that allow connection to a fuel conduit 330 and an electrolyte conduit 332, respectively. Fuel conduit 330 and electrolyte conduit 332 are connected to a fuel inlet port 334 and an electrolyte inlet port 336 of second liquid membrane cell assembly 304.

Similarly, second liquid membrane cell assembly 304 includes a base 338, an anode 340, a cathode 342, and end plates 344. The base includes an inlet end portion 346, an outlet end portion 348, and a central portion 350 disposed between the inlet and outlet end portions. Inlet end portion 346 includes fuel inlet port 334 and electrolyte inlet port 336. As discussed above, fuel inlet port 334 and/or electrolyte inlet port 336 include threads and/or other connection structures that allow connection to fuel conduit 330 and electrolyte conduit 332, respectively. Outlet end portion 348 includes a fuel outlet port 352 and an electrolyte outlet port 354. Fuel outlet port 352 and/or electrolyte outlet port 354 include threads and/or other connection structures that allow connection to a fuel outlet conduit 356 and an electrolyte outlet conduit 358, respectively. Fuel outlet conduit 356 and electrolyte outlet conduit 358 may be connected to containers and/or tanks and/or downstream liquid membrane cell assemblies.

System 300 may additionally include one or more state of charge (SoC) measurement assemblies 360, which may be positioned in any suitable locations, such as the outputs of the first and/or second liquid membrane cell assemblies. Fuel conduit 330 and/or electrolyte conduit 332 include optical and/or transparent windows 362. SoC measurements assemblies 360 include one or more wavelength photon lamps 364 and one or more spectrophotometer cameras 366 (or other similar wavelength differentiated photometer devices). Wavelength photon lamp 364 may, for example, be positioned on one side and adjacent to optical window 362 and spectrophotometer camera 366 may be positioned on the other or opposite side of the same optical window (and/or opposite of the wavelength photon lamp). In other words, the electrolyte or fuel conduit is disposed between the wavelength photon lamp and the spectrophotometer camera. Although the SoC measurement assembly is shown to measure both fuel and electrolyte conduits, other examples may measure fluids only in the fuel or only the electrolyte conduit. SoC measurement assembly may additionally, or alternatively, be used to measure fluids contained in the mixed electrolyte conduits.

Figure 19:
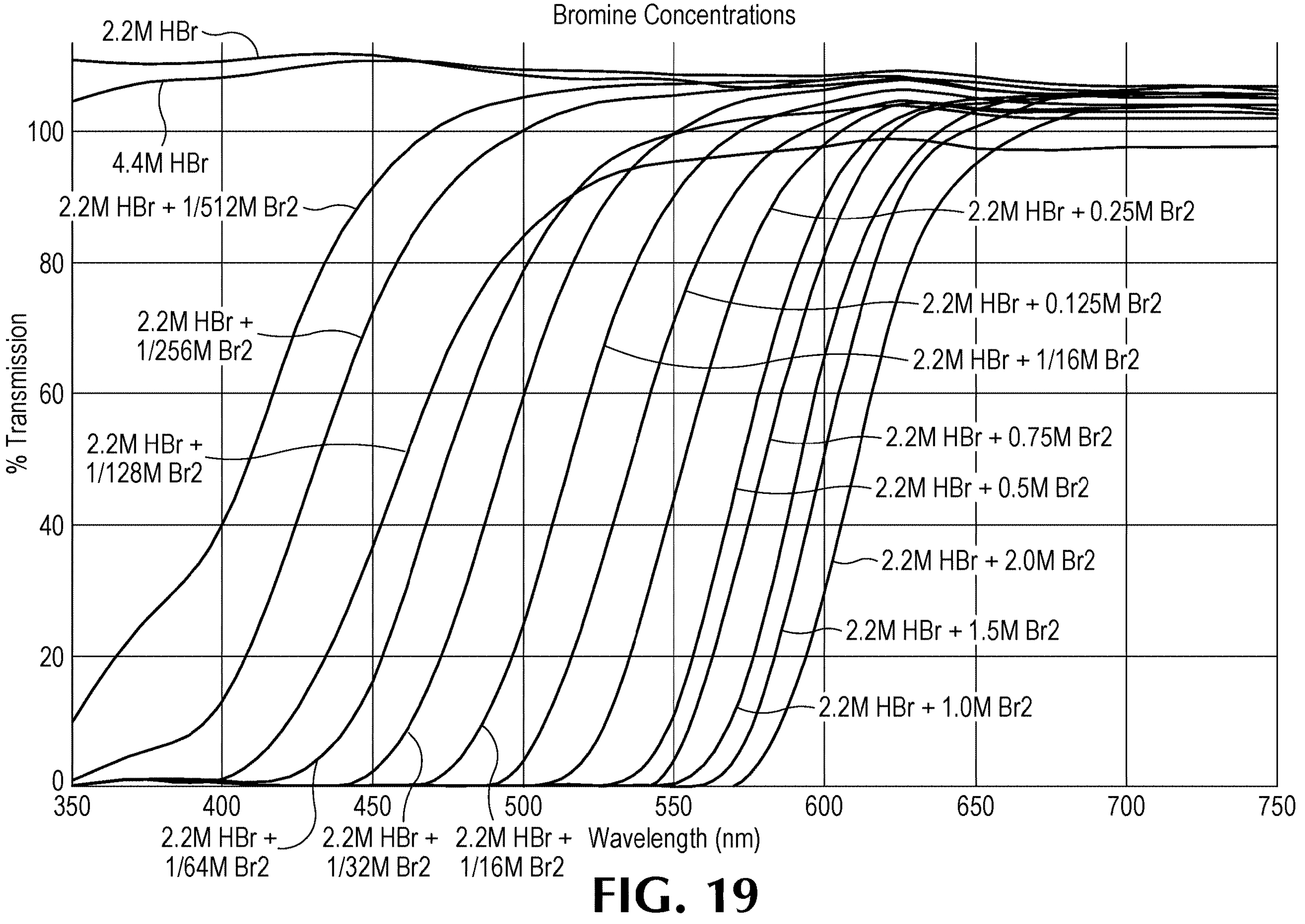
FIG. 19 is a graph of transmission profiles of various HBr/Br mixtures for the liquid membrane cell assembly of FIG. 1.

When elemental bromine (deep red/amber color) and hydrogen bromide (transparent) are used as the fuel and electrolyte, respectively, a spectrophotometer camera can measure the opacity of the fluid at the most determinate wavelength to determine the fraction of $Br_2$ within the fluid as well as the SoC of the fuel line and the purity of the electrolyte line. In other words, the concentration of $Br_2$ is determined by transmission at determinative wavelengths, as shown in FIG. 19. The measurements may be used to actively control the liquid membrane cell assemblies. For example, if the fuel must run through three serially in-line liquid membrane cell assemblies to drop to an expected level of SoC, measurements before the second and/or third liquid membrane cell assemblies may provide enough information to be able to determine whether or not those assemblies are required for the expected or desired level of SoC.

Figure 20:
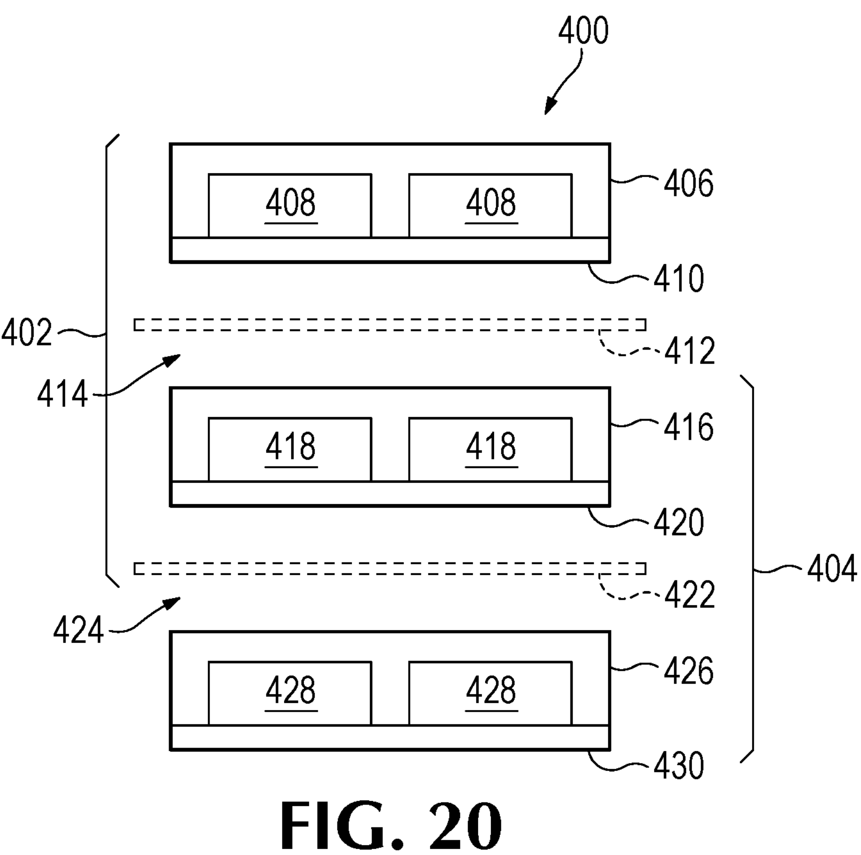
FIG. 20 is an exploded schematic view of an example of a non-alternating cell stacking for two liquid membrane cell assemblies of FIG. 1.

Referring to FIG. 20, a system 400 having a first liquid membrane cell assembly 402 and a second membrane cell assembly 404 with a non-alternating form of cell stacking. The first and second liquid membrane cell assemblies may include one or more components and/or one or more structures of other liquid membrane cell assemblies of the present disclosure. First liquid membrane cell assembly 402 includes a first bipolar plate 406 having reactant gas reservoirs 408 and an anode/cathode 410, a base 412 having an open or mixing area 414 for the electrolyte and fuel, and a second bipolar plate 416 having reactant reservoirs 418 and an anode/cathode 420. Second liquid membrane cell assembly 404 include second bipolar plate 416 having reactant gas reservoirs 418 and anode/cathode 420, a base 422 having an open or mixing area 424 for the electrolyte and fuel, and a third bipolar plate 426 having reactant reservoirs 428 and an anode/cathode 430. As shown, the first and second liquid membrane cell assemblies are stacked such that anode/cathode 410 serves as the cathode for first liquid membrane cell assembly 402 and as the anode for second liquid membrane cell assembly 404. The configuration shown in FIG. 20 increases the voltage of the stack while reducing the overall current of the stack (i.e., high voltage and low current configuration) and reduces the effect of resistive losses. The above bipolar plates (e.g., carbon/graphite plates) may be machined to allow the inclusion of reactant gas (e.g., hydrogen gas) on the back side of the gas diffusion surface while still providing structural support and a reaction surface for the fuel reaction in the neighboring cell.

Figure 21:
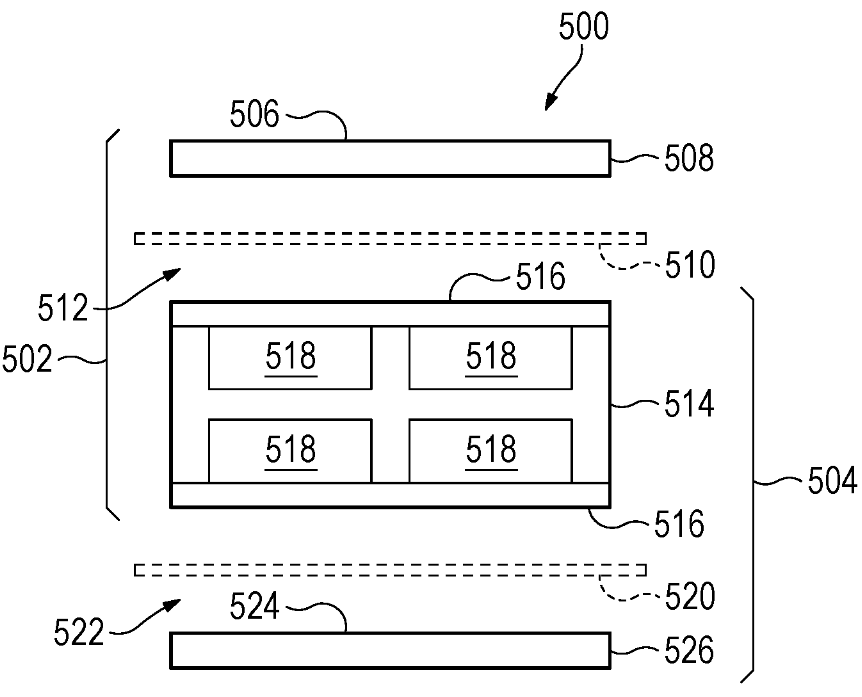
FIG. 21 is an exploded schematic view of an example of an alternating cell stacking for two liquid membrane cell assemblies of FIG. 1.

Referring to FIG. 21, a system 500 having a first liquid membrane cell assembly 502 and a second membrane cell assembly 504 with an alternating form of cell stacking. The first and second liquid membrane cell assemblies may include one or more components and/or one or more structures of other liquid membrane cell assemblies of the present disclosure. First liquid membrane cell assembly 502 includes a first bipolar plate 506 having an anode/cathode 508, a base 510 having an open or mixing area 512 for the electrolyte and fuel, and a second bipolar plate 514 having opposed anodes/cathodes 516 and reactant gas reservoirs 518 disposed between the anodes/cathodes. Second liquid membrane cell assembly 504 include second bipolar plate 514 having anodes/cathodes 516 and reactant gas reservoirs 518, a base 520 having an open or mixing area 522 for the electrolyte and fuel, and a third bipolar plate 524 having an anode/cathode 526.

As shown, the first and second liquid membrane cell assemblies are stacked such that anodes/cathodes 516 serves as the anode for both first liquid membrane cell assembly 502 and second liquid membrane cell assembly 504. The configuration shown in FIG. 21 provides high current and low voltage with the cells being electrically parallel. Additionally, the configuration in FIG. 21 reduces the number of hydrogen gas reservoirs but requires electrical connection to each level (i.e., parallel circuits). The above bipolar plates (e.g., carbon/graphite plates) may be machined to allow the inclusion of reactant gas (e.g., hydrogen gas) on the back side of the gas diffusion surface while still providing structural support and a reaction surface for the fuel reaction in the neighboring cell.

INDUSTRIAL APPLICABILITY

The present disclosure, including liquid membrane cell assemblies and components of those assemblies, is applicable to the fuel-processing, flow battery, and other industries.

The disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where any claim recites "a" or "a first" element or the equivalent thereof, such claim should be understood to include incorporation of one or more such elements, neither requiring nor excluding two or more such elements.

Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the inventions of the present disclosure.

What is claimed is:

1. A liquid membrane cell assembly, comprising:

an elongate base having opposed first and second end portions and a central portion disposed between the first and second end portions, wherein the first end portion includes:

a first elongate body, a first electrolyte channel within the first body, an electrolyte inlet port in the first body, the electrolyte inlet port being fluidly connected to the first electrolyte channel, a first fuel channel within the first body, the first fuel channel being separate and distinct from the first electrolyte channel, and a fuel inlet port in the first body and adjacent the electrolyte inlet port, the fuel inlet port being fluidly connected to the first fuel channel, the fuel inlet port being separate and distinct from the electrolyte inlet port, wherein the second end portion includes:

a second elongate body, a second electrolyte channel within the second body, an electrolyte outlet port in the second body, the electrolyte outlet port being fluidly connected to the second electrolyte channel, a second fuel channel within the second body, the second fuel channel being separate and distinct from the second electrolyte channel, and a fuel outlet port in the second body, the fuel outlet port being fluidly connected to the second fuel channel, the fuel outlet port being separate and distinct from the electrolyte outlet port, wherein the central portion includes spaced and opposed first and second bridge members that connect the first and second elongate bodies, wherein the first and second elongate bodies and the first and second bridge members collectively and horizontally define an open area therebetween, wherein the open area fluidly connects the first electrolyte channel and the first fuel channel with the second electrolyte channel and the second fuel channel;

an anode adjacent the first and second bridge members of the central portion; and a cathode adjacent the first and second bridge members of the central portion such that the elongate base is disposed between the anode and the cathode, wherein the anode and cathode vertically define the open area therebetween.

2. The assembly of claim 1, wherein the second end portion further includes:

a mixed electrolyte channel within the second elongate body and disposed between the second electrolyte channel and the second fuel channel, the mixed electrolyte channel being separate and distinct from the second electrolyte channel and the second fuel channel, wherein the open area fluidly connects the first electrolyte channel and the first fuel channel with the second electrolyte channel, the mixed electrolyte channel, and the second fuel channel of the second portion; and a mixed electrolyte outlet port in the second elongate body, the mixed electrolyte outlet port being fluidly connected to the mixed electrolyte channel, the mixed electrolyte outlet port being separate and distinct from the electrolyte outlet port and the fuel outlet port.

3. The assembly of claim 2, wherein the first electrolyte channel and the first fuel channel are parallel to each other, and wherein the second electrolyte channel, the mixed electrolyte channel, and the second fuel channel are parallel to each other.

4. The assembly of claim 1, wherein the central portion further includes a central bridge member that connects the first and second elongate bodies, the central bridge member being spaced from and disposed between the first and second bridge members.

5. The assembly of claim 4, wherein the central bridge member is sized such that the central bridge member divides the open area into separate and distinct first and second mixing areas.

6. The assembly of claim 5, wherein the central bridge member includes one or more cut-outs or apertures.

7. The assembly of claim 4, wherein the central bridge member is sized to allow fluid on one side of the central bridge member to mix with fluid on the other side of the central bridge member.

8. The assembly of claim 4, wherein the central portion further includes at least one mixing wing attached to, or formed with, the central bridge member.

9. The assembly of claim 8, wherein each of the mixing wings has a triangular prism shape.

10. The assembly of claim 1, wherein each of the first and second bridge members includes opposed internal and external walls, the internal wall being adjacent the open area and the external wall being spaced from the open area relative to the internal wall, and wherein the central portion further includes one or more mixing wings attached to, or formed with, the internal wall of at least one of the first and second bridge members.

11. The assembly of claim 10, wherein each of the mixing wings has a shape of a triangular prism rotated about its longitudinal axis.

12. The assembly of claim 10, wherein the mixing wings are parallel to the first electrolyte channel or the first fuel channel.

13. The assembly of claim 1, wherein the first and second bridge members are parallel to each other.

14. The assembly of claim 1, wherein the first and second bridge members converge at the elongate second body relative to the first elongate body.

15. The assembly of claim 1, wherein at least one of the anode or cathode includes a cavity, and wherein the open area is partially defined by the cavity.

16. The assembly of claim 1, further comprising:

a first end plate adjacent to the anode such that the anode is disposed between the first end plate and the elongate base;

a second end plate adjacent to the cathode such that the cathode is disposed between the second end plate and the elongate base; and a plurality of fasteners securing the first and second end plates together.

17. The assembly of claim 16, wherein the first end plate includes at least one reactant port that is fluidly connected to the anode.

18. The assembly of claim 1, further comprising a fuel outlet conduit connected to the fuel outlet port, the fuel outlet conduit including one or more transparent portions to allow visual inspection of the fluid in the fuel outlet conduit.

19. The assembly of claim 18, further comprising:

a wavelength photon lamp positioned adjacent a transparent portion of the one or more transparent portions; and a spectrophotometer camera positioned opposite the wavelength photon lamp such that the fuel outlet conduit is disposed between the photon lamp and the spectrophotometer camera.

20. A liquid membrane cell system, comprising two of the liquid membrane cell assembly of claim 1, wherein the cathode of one of the liquid membrane cell assemblies is the anode of the other of the liquid membrane cell assemblies.

21. A liquid membrane cell system, comprising two of the liquid membrane cell assembly of claim 1, wherein the anode of one of the liquid membrane cell assemblies is the anode of the other of the liquid membrane cell assemblies.

* * * * *